United States Patent
Rangaraju et al.

(10) Patent No.: US 9,600,327 B2
(45) Date of Patent: Mar. 21, 2017

(54) PROCESS SCHEDULING AND EXECUTION IN DISTRIBUTED COMPUTING ENVIRONMENTS

(71) Applicant: Oracle International Corporation, Redwood Shores, CA (US)

(72) Inventors: Ramasimha Rangaraju, Bangalore (IN); Virad Gupta, Fremont, CA (US); Deepankar Narayanan, Trivandrum (IN); Raghu Edalur, San Ramon, CA (US); Mohini Sahoo, Bangalore (IN); Vivek Verma, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 22 days.

(21) Appl. No.: 14/685,293

(22) Filed: Apr. 13, 2015

(65) Prior Publication Data

US 2016/0011912 A1    Jan. 14, 2016

Related U.S. Application Data

(60) Provisional application No. 62/022,964, filed on Jul. 10, 2014.

(51) Int. Cl.
*G06F 9/46* (2006.01)
*G06F 9/48* (2006.01)
(Continued)

(52) U.S. Cl.
CPC ............ *G06F 9/4843* (2013.01); *G06F 21/50* (2013.01); *G06Q 10/06* (2013.01)

(58) Field of Classification Search
CPC .... G06F 9/4843; G06F 9/4881; G06F 9/5083; G06F 21/50; Y02B 60/144; G06Q 10/06
(Continued)

(56) References Cited

U.S. PATENT DOCUMENTS

| 6,038,539 A | * | 3/2000 | Maruyama | ............ G06F 9/4881 700/100 |
| 6,574,628 B1 | * | 6/2003 | Kahn | .................... G06F 9/4862 718/1 |

(Continued)

OTHER PUBLICATIONS

Brucker et al. "Resource-constrained project scheduling: Notation, classi® cation, models, and methods", 1999, Elsevier.*

(Continued)

*Primary Examiner* — Wei Zhen
*Assistant Examiner* — Junchun Wu
(74) *Attorney, Agent, or Firm* — Kilpatrick Townsend & Stockton LLP

(57) ABSTRACT

Embodiments of the invention provide systems and methods for scheduling and executing user-restricted processes within distributed computing systems. More specifically, certain embodiments of the present invention describe systems and methods by which runtime requests to execute user-restricted processes may be received, processed, and scheduled via a user application of an enterprise system or other distributed computing system. Requests may be received via transaction pages of user applications to schedule and execute user-restricted processes. The user application, a process scheduler, and/or other components within the distributed computing system may determine user contexts associated with the requests, and may determine whether or not the requested processes may be scheduled and executed. Such processes may include, for example, report generation processes, processes to initiate system functions, and/or processes to perform system maintenance within the distributed computing environment.

28 Claims, 10 Drawing Sheets

(51) Int. Cl.
*G06Q 10/06* (2012.01)
*G06F 21/50* (2013.01)

(58) Field of Classification Search
USPC .......................................................... 718/105
See application file for complete search history.

(56) References Cited

U.S. PATENT DOCUMENTS

| | | | | |
|---|---|---|---|---|
| 6,606,744 | B1* | 8/2003 | Mikurak | H04L 29/06 717/174 |
| 7,213,020 | B1* | 5/2007 | Pal | G06F 17/30377 718/101 |
| 7,386,586 | B1* | 6/2008 | Headley | G06F 9/5033 718/102 |
| 7,509,642 | B1* | 3/2009 | Mitchell | H04Q 3/0087 718/101 |
| 7,881,957 | B1* | 2/2011 | Cohen | G06Q 10/06 |
| 8,239,918 | B1* | 8/2012 | Cohen | G06F 21/12 726/1 |
| 8,490,097 | B2* | 7/2013 | Sano | G06F 17/30306 718/105 |
| 8,813,245 | B1* | 8/2014 | Corley | G06F 21/62 709/226 |
| 8,943,509 | B2* | 1/2015 | Bansal | G06F 9/4881 718/103 |
| 9,329,909 | B1* | 5/2016 | Khanna | G06F 9/5072 |
| 2003/0074387 | A1* | 4/2003 | Tanaka | G06F 9/5038 718/103 |
| 2007/0198979 | A1* | 8/2007 | Dice | G06F 9/466 718/100 |
| 2009/0007132 | A1* | 1/2009 | Berretta | G06F 9/5027 718/104 |
| 2009/0064303 | A1* | 3/2009 | Dickinson | G06Q 10/06 726/10 |
| 2009/0300623 | A1* | 12/2009 | Bansal | G06F 9/5066 718/102 |
| 2011/0099553 | A1* | 4/2011 | Agarwal | G06F 9/4881 718/105 |
| 2012/0233547 | A1* | 9/2012 | McLachlan | G06Q 10/06 715/733 |
| 2013/0104140 | A1* | 4/2013 | Meng | G06F 9/5066 718/104 |

OTHER PUBLICATIONS

Shi, "Scheduling tasks with precedence constraints on heterogeneous distributed computing systems", Dec. 2006, University of Tennessee.*
Liu et al., "Distributed Energy-Efficient Scheduling for Data-Intensive Applications with Deadline Constraints on Data Grids", 2008 IEEE.*
Chetto et al. "Dynamic Scheduling of Real-Time Tasks under Precedence Constraints", 1990, Kluwer Academic.*

\* cited by examiner

FIG. 7A

Purchase Order Inquiry

Purchase Order  — 700a

Business Unit:
PO ID:

Actions  — 702
Generate Vendor PO Report
Generate My PO History

▼ Header  — 701

PO Date: 08/08/2000
Vendor Name: NORTHERN-001
Vendor ID: AUS0000002             Vendor Details
Buyer: Kenneth
PO Reference: Schumacher PO Status: Approved
Budget Status: Valid Header Details      All RTV            Document Status
Header Comments     Matching           Header VAT
Change Order        Activity Summary Backorder Status: Not Backordered
Receipt Status: Not Recvd
☐ Hold From Further Processing Amount Summary
Merchandise: 2,781.58
Freight/Tax/Misc: 278.15
Total: 3,059.73 AUD

Lines

Personalize | Find | View All | 🔳 🔳    First ◀ 1 of 1 ▶ Last

| Line | Item ID | Item Description | Category | PO Qty | | Merchandise Amount | | Status |
|---|---|---|---|---|---|---|---|---|
| 1 | FRA-15 | Network Card | 0004 | 13.0000 | EA | 2,781.58 | AUD | Approved |

◀ Return to Search    ◀ Previous in List  ▶ Next in List                                          Related Links

PROCESS SCHEDULING AND EXECUTION IN DISTRIBUTED COMPUTING ENVIRONMENTS

RELATED APPLICATIONS

The present application claims priority under 35 U.S.C. §119(e) to U.S. Provisional Patent Application No. 62/022,964, filed Jul. 10, 2014, entitled "USER CONTEXT-BASED SECURE SELF-SERVICE REPORTING IN DISTRIBUTED ENVIRONMENTS," the entire contents of which are incorporated herein by reference for all purposes.

BACKGROUND OF THE INVENTION

The ability of users to initiate tasks such as report generation, system maintenance functions, and other process scheduling and execution tasks within the hardware, communications networks, software, and data storage components of distributed computing environments is critical to the businesses and organizations that rely on these computing environments. Such systems are often the lifeblood of businesses, educational institutions, governmental agencies, and the like. These distributed computing environments are required to support the needs of the organization at the hardware level, to provide internal and external networking needs, to support various software capabilities for end users and administrators, and to provide back-end data storage solutions. For such systems to be effective and useful to an organization, they must provide all of these capabilities in a secure, reliable, stable, and scalable infrastructure that offers a high level of performance for users inside and outside of the organization.

In many distributed computing environments, user applications may provide no capability for end users to generate reports and to schedule and execute other user-restricted processes. In such systems, users may be required to request help from system administrators or other authorized users to execute these user-restricted processes. System administrators and authorized users may schedule and execute these processes by accessing secure administrative applications or specific secure transaction pages within user applications. Providing end users with access to these secure applications and pages may cause security risks and system vulnerabilities. Moreover, scheduling and executing processes within a distributed environment may be a complex activity requiring the user initiating the scheduling and execution request to have specific knowledge and to perform actions in multiple system components. For example, a user that schedules a process for execution may need to have functional knowledge of the application run control which contains the functional set of parameters for executing processes. Additionally, the user may need to have knowledge of the scheduling parameters to be provided in order to schedule and execute the process, such as the system servers, user distribution lists, and the like. Such users also may be required to navigate across multiple application pages, such as application run control pages and process request pages in order to schedule the process. In this example, the user also may need to navigate to a process monitor page in order to monitor the progress of the process scheduling and execution, and to obtain status updates along with links to reports and other outputs generated by the process.

BRIEF SUMMARY OF THE INVENTION

Embodiments of the invention provide systems and methods for scheduling and executing user-restricted processes within distributed computing systems. More specifically, certain embodiments of the present invention describe systems and methods by which runtime requests to execute user-restricted processes may be received, processed, and scheduled via a user application of an enterprise system or other distributed computing system. In certain embodiments, requests may be received via transaction pages of user applications to schedule and execute user-restricted processes within a distributed computing system. The user application, a process scheduler, and/or other components within the distributed computing system may determine a user context associated with the request, such as the identity and permissions of the requesting user, the properties of the transaction page of the user application, the current state of the user application, and/or the properties of other user applications or other underlying resources within the distributed environment. Based on the retrieved and determined user context data, a determination is made whether or not the requested process is permitted to be scheduled. If the user-restricted process is permitted based on the user context data and other factors, the process may be scheduled and executed within the distributed computing environment. Such processes may include, for example, report generation processes, processes to initiate/trigger of system functions, and/or processes to perform system maintenance functions within the distributed environment.

In certain embodiments, the process scheduling and execution functionality may be implemented and enabled within various user applications of the distributed computing environment during the application design and development phases, during the application deployment phase, and during the application execution phase. For example, an application designer may enable scheduling and execution of certain processes from certain application transaction pages, and may define an initial set of parameters for the process execution. In some embodiments, application designers also may define one or more modifiable parameters that may be set by users during execution of the application. During the deployment of the application within the distributed computing environment, system administrators or other authorized users may set additional parameters for the process scheduling and execution, along with user permissions and run control settings to govern the execution of the user application, and to govern the scheduling and execution of any processes initiated by users via the user application. Finally, during execution of the user application, end users may request the scheduling and execution of user-restricted processes, and may have the opportunity to set additional parameters and/or overwrite parameters previously defined during the application development or deployment phases.

BRIEF DESCRIPTION OF THE DRAWINGS

FIGS. 7A and 7B illustrate example interfaces for scheduling and executing a user-restricted process via a user application within a distributed computing environment, according to one or more embodiments of the present invention.

DETAILED DESCRIPTION OF THE INVENTION

Figure 1:
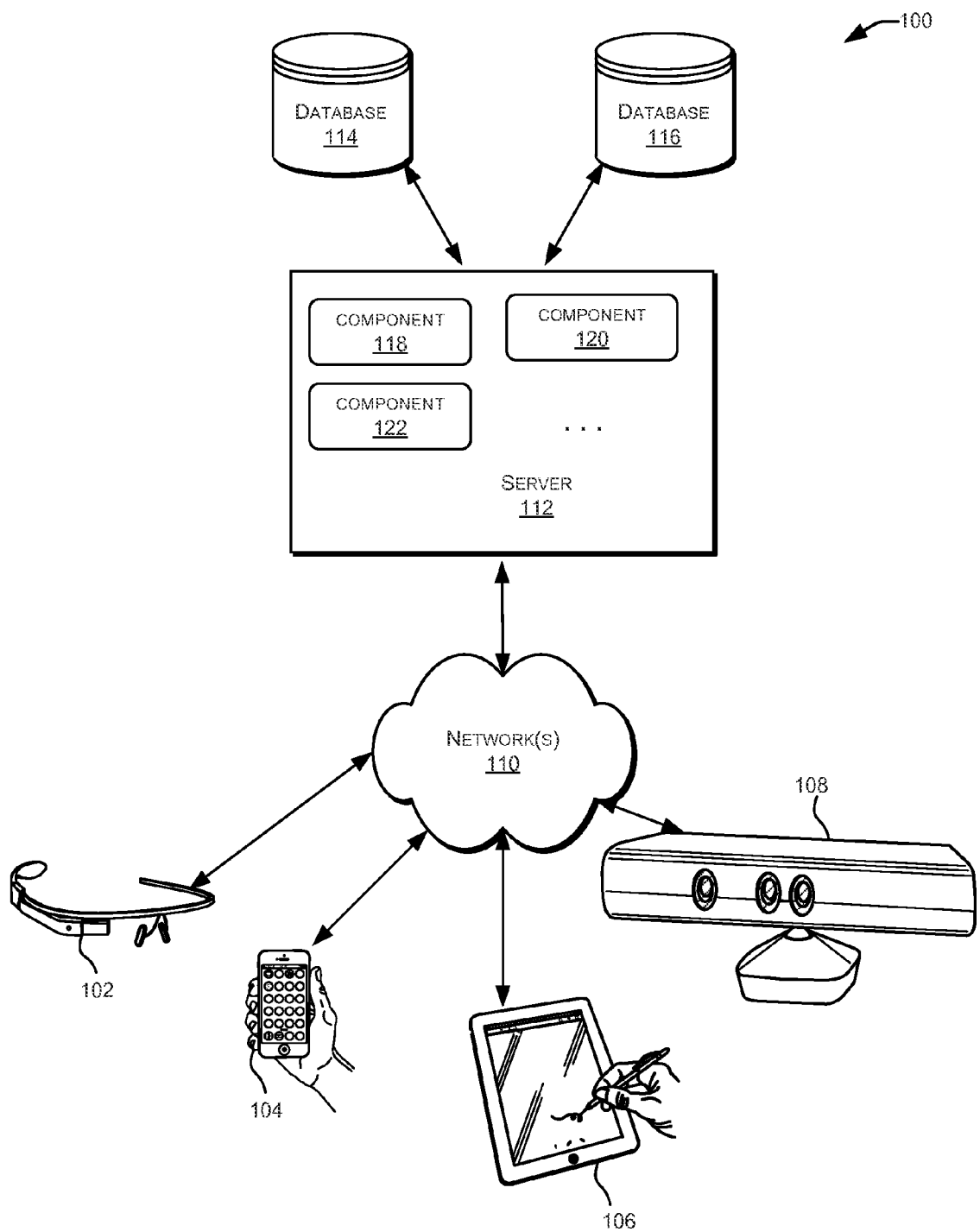
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for an application design, deployment, and execution methodology which enable users of applications in enterprise systems and other distributed computing environments to execute user-restricted processes and generate user-restricted reports. Certain examples and embodiments described herein may provide automatic and secure mechanisms for user context data flow from the current transaction pages of a user's application sessions to the submitted requests for process scheduling and execution. Further, users may be notified via the user applications regarding process scheduling and execution status, and may be provided with links to generated reports and other process outputs. Some embodiments may also provide generic and secure mechanisms to allow end users in distributed computing environments such as enterprise systems to generate reports and execute processes using existing functionality based on their specific data, while preventing the user from generating reports and executing processes based on other users' data. Alternatively or additionally, various embodiments may allow end users to input runtime variables for process scheduling and execution and report generation without impersonation, using verification mechanisms that are specific to the user and the current user context. Additionally, in some cases the user may be permitted to trigger the scheduling and execution of a process without accessing or visiting the user-restricted pages from which such processes are scheduled or launched.

More specifically, various embodiments and examples described herein may provide an option for end users to execute processes such as report generation and other enterprise processes while handling many security concerns. In various embodiments, end users may be restricted from executing processes via the user-restricted transaction pages that administrators any other authorized users may use to executing processes, but these end users may be allowed to generate reports and execute certain user-restricted processes using the functionality embedded and configured for them within the accessible transaction pages of their user applications. Once an end user initiates the scheduling and execution of a process, the algorithms described herein may retrieve and/or determine user context data, create parameter sets and other run control settings, spawn the necessary processes, track the transaction pages of the application that the user is using currently, and push notifications back to the user relating to the status of the process scheduling and execution, including links to any generated reports or other process output. Thus, some embodiments described herein may include an automatic run control creation mechanism which may gather data from transaction pages of user applications, and may use a component interface to create the mechanisms that allow run controls to be inserted into application tables based on user privileges to execute the process, and send notifications back to the user on the process status. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
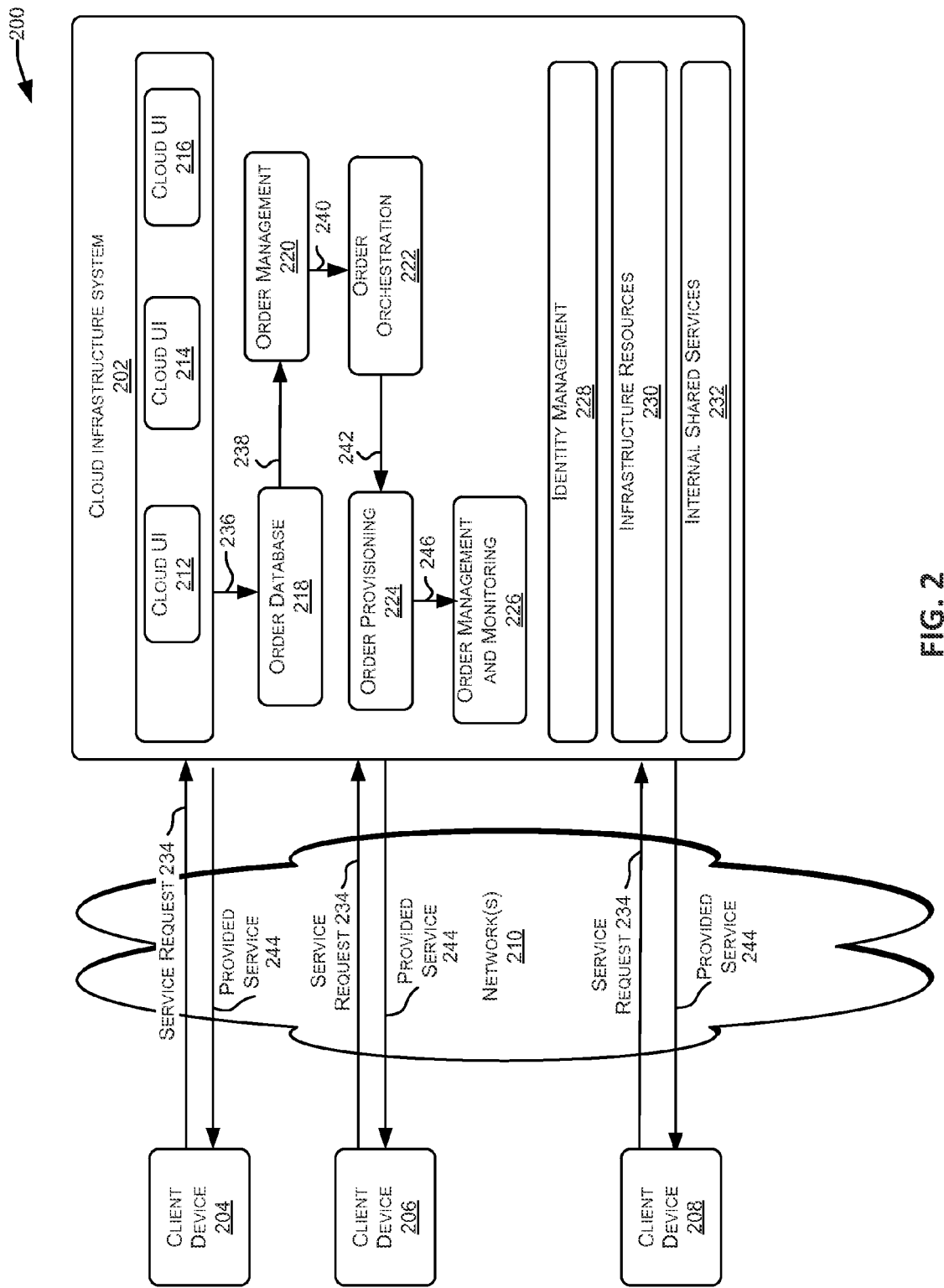
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
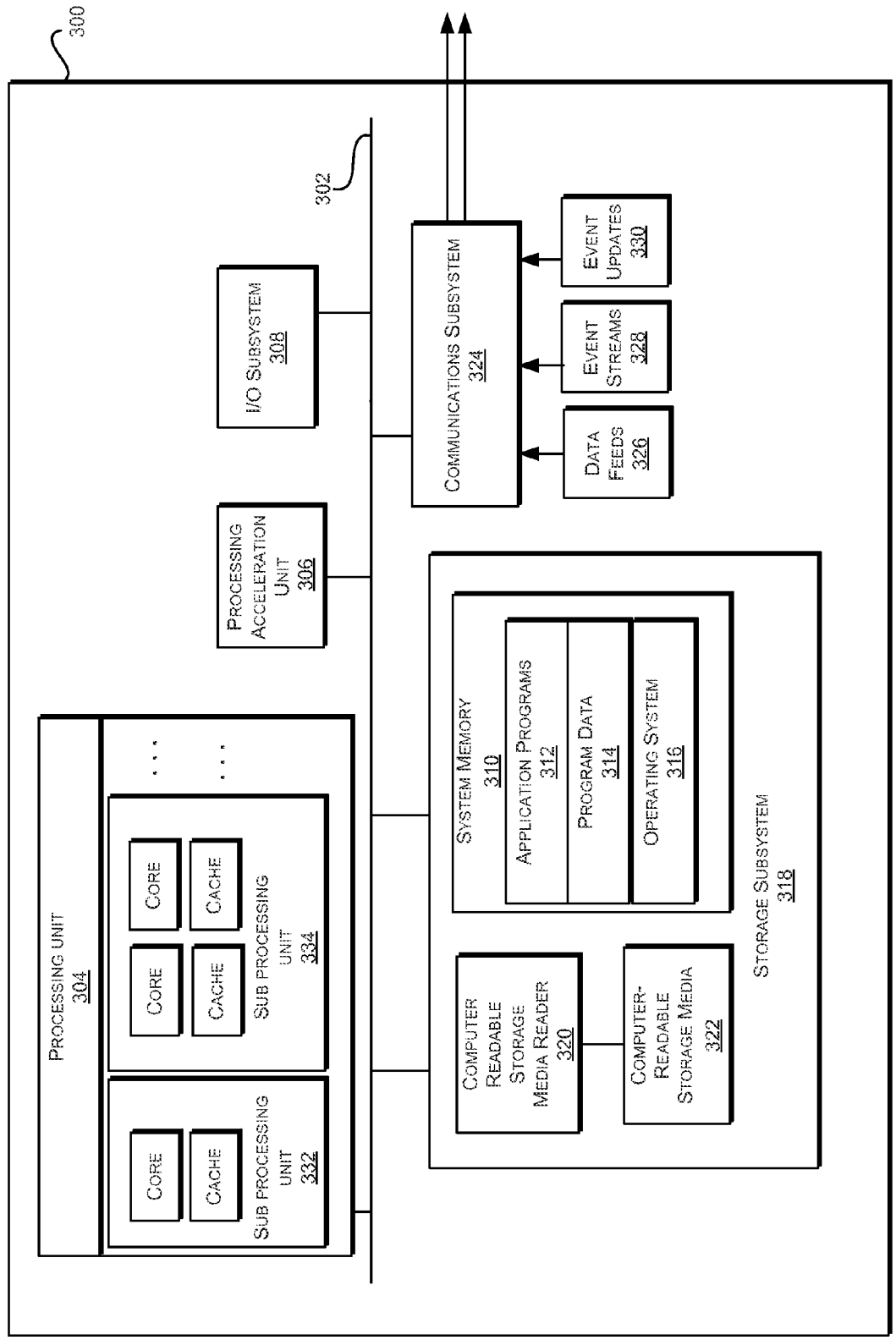
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide systems and methods for an application design, deployment, and execution methodology which enable users of applications in enterprise systems and other distributed computing environments to execute user-restricted processes and generate user-restricted reports. Certain examples and embodiments described herein may provide automatic and secure mechanisms for user context data flow from the current transaction pages of a user's application sessions to the submitted requests for process scheduling and execution. Further, users may be notified via the user applications regarding process scheduling and execution status, and may be provided with links to generated reports and other process outputs. Some embodiments may also provide generic and secure mechanisms to allow end users in distributed computing environments such as enterprise systems to generate reports and execute processes using existing functionality based on their specific data, while preventing the user from generating reports and executing processes based on other users' data. Alternatively or additionally, various embodiments may allow end users to input runtime variables for process scheduling and execution and report generation without impersonation, using verification mechanisms that are specific to the user and the current user context. Additionally, in some cases the user may be permitted to trigger the scheduling and execution of a process without accessing or visiting the user-restricted pages from which such processes are scheduled or launched.

More specifically, various embodiments and examples described herein may provide an option for end users to execute processes such as report generation and other enterprise processes while handling many security concerns. In various embodiments, end users may be restricted from executing processes via the user-restricted transaction pages that administrators any other authorized users may use to executing processes, but these end users may be allowed to generate reports and execute certain user-restricted processes using the functionality embedded and configured for them within the accessible transaction pages of their user applications. Once an end user initiates the scheduling and execution of a process, the algorithms described herein may retrieve and/or determine user context data, create parameter sets and other run control settings, spawn the necessary processes, track the transaction pages of the application that the user is using currently, and push notifications back to the user relating to the status of the process scheduling and execution, including links to any generated reports or other process output. Thus, some embodiments described herein may include an automatic run control creation mechanism which may gather data from transaction pages of user applications, and may use a component interface to create the mechanisms that allow run controls to be inserted into application tables based on user privileges to execute the process, and send notifications back to the user on the process status. Various additional details of embodiments of the present invention will be described below with reference to the figures.

Figure 4:
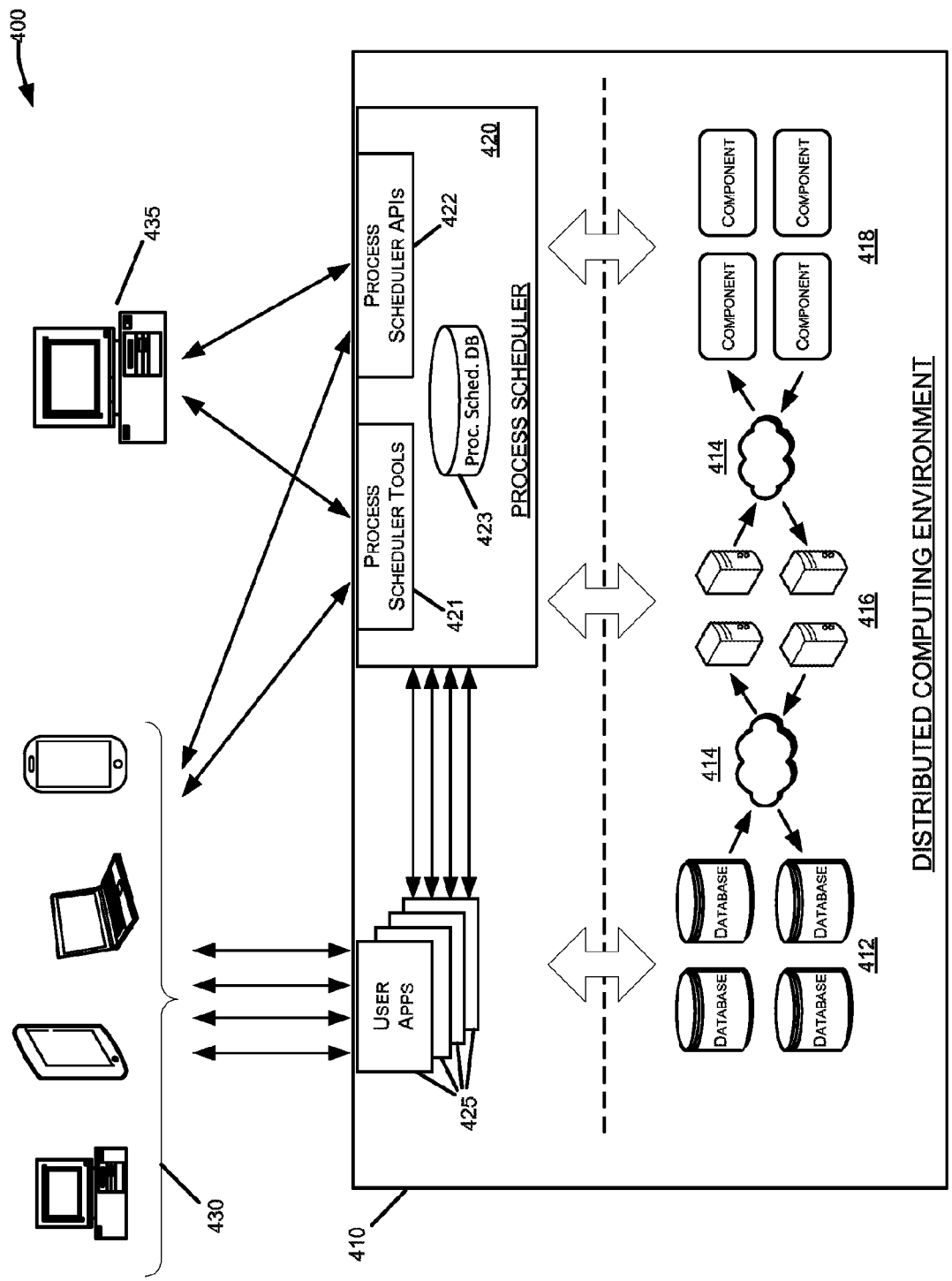
FIG. 4 is a block diagram illustrating, at a high-level, components of a system for process scheduling and execution in a distributed computing environment in which embodiments of the present invention may be implemented.

FIG. 4 is a block diagram illustrating components of a system 400 for implementing process scheduling and execution in a distributed computing environment 410 according to one or more embodiments of the present invention. The system 400 and/or the distributed computing environment 410 illustrated in this example may correspond to a high-level computer architecture of an enterprise or organization that provides computing resources and functionality to various users 430-435. Specific examples of system 400 may include, without limitation, enterprise resource planning (ERP) systems, document management systems, eCommerce systems, customer relationship management (CRM) systems, and the like. Thus, system 400 and/or the distributed computing environment 410 may be built and maintained by an enterprise or other organization, such as an educational institution or governmental entity, to provide services to users such as customers, employees, students, or other organization members. As shown in FIG. 4, the system 400 may be implemented as a multi-tier computer architecture, which may include web-based and/or cloud-based implementations, and in which upper-tier user devices (e.g., user devices 430 and supervisor/administrator devices 435) are provided data and services via middle-tier components (e.g., process scheduler 420 and user applications 425), which are executed upon an underlying set of hardware and/or software resources 412-418.

In this example, middle-tier components such as process scheduler tools 421, process scheduler application programming interface (API) 422, and user applications 425, may be implemented in hardware, software, or a combination of hardware and software. As discussed in more detail below, the process scheduler 420 may interact with one or more user devices 430 and/or supervisor/administrator devices 435, the user applications 425, and the underlying system hardware or software components (e.g., databases 412, network devices 414, computer servers 416, and software components 418) to design, deploy, and execute applications with user-restricted process scheduling and execution functionality. In some embodiments, the process scheduler 420 and user applications 425 may be implemented as part of the distributed computing environment 410, as shown in FIG. 4. For example, the process scheduler 420 and/or user applications 425 may be software components executing on the same computer server(s) 416, networks 414, and databases 412, as other software applications 418 in the system. In other embodiments, the process scheduler 420 and/or one or more user applications 425 may be executed on dedicated hardware and/or software, for example, on separate computer servers that communicate with user devices 430 and supervisor/administrator devices 435, and with various systems 412-418 within the distributed computing environment 410. In some cases, the process scheduler 420 may be dedicated to a distributed computing environment 410, whereas in other cases, a single process scheduler 420 may interact with multiple different computing environments 410 maintained by different organizations.

In the example system 400 shown in FIG. 4, the combination of the process scheduler 420 and the user applications 425 designed and deployed within the system 400 may provide user-restricted process scheduling and execution functionality within the distributed computing environment 410. As discussed below in more detail, user devices 430 and/or supervisor/administrator devices 435 may communicate with the process scheduler 420 to define the process scheduling and execution functionality that will be available for different users and different user contexts from within different applications 425. For example, an authorized user 430 or administrator 435 may identify to the process scheduler 420 a specified set of processes that may be executed via a user application 425, including identifying the transaction pages (e.g., application user interfaces, application webpages, etc.) of the application 425 from which the processes may be executed, the specific users that are authorized to execute different processes from different transaction pages, and the specific user contexts that will be permitted/required for executing different processes from the different transaction pages. Devices 430 and 435 may interact with the process scheduler 420 via process scheduler tools 421 or via an API 422 of the process scheduler. After the process scheduling and execution functionality, users 430 then may interact with different user applications 425, and may initiate process scheduling and execution from the different transactions pages of the user applications 425, in accordance with the previously defined limitations on transactions pages, users, and users' contexts.

Figure 5:
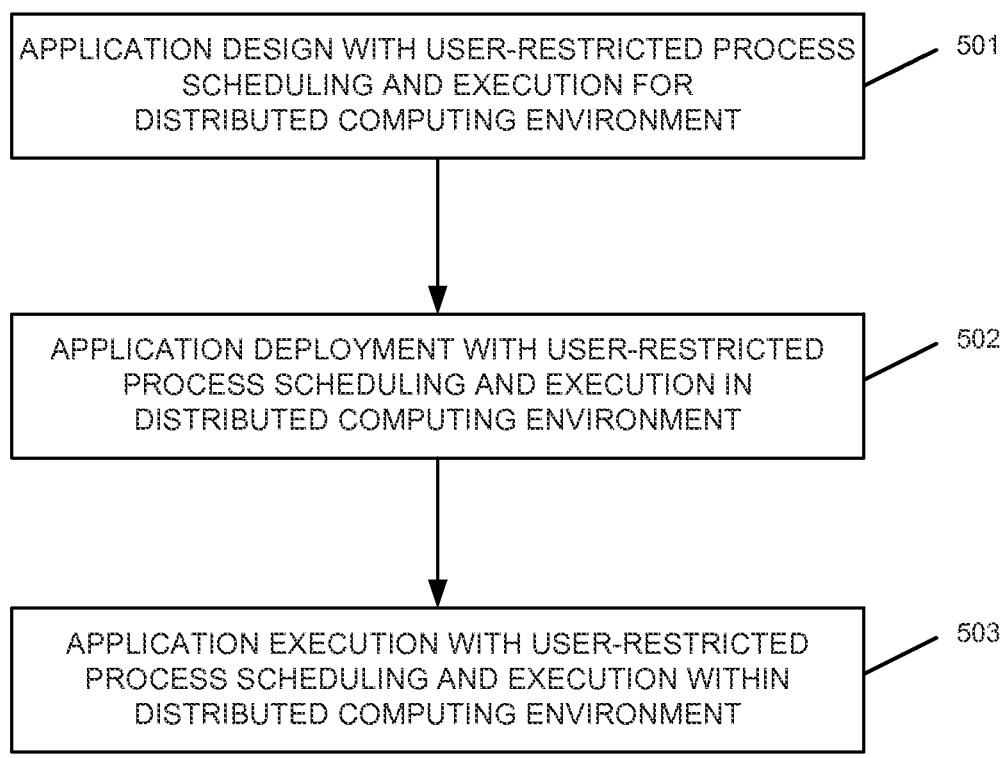
FIG. 5 is a flowchart illustrating a process for designing, deploying, and executing an application with user-restricted process scheduling and execution functionality within a distributed computing environment, according to one or more embodiments of the present invention.

FIG. 5 is a flowchart illustrating an example process for designing, deploying, and executing an application with user-restricted process scheduling and execution functionality within a distributed computing environment. As described below, the different steps in this process may be performed by one or more components in the example system 400, such as user devices 430, administrator/supervisor device 435, process scheduler 420, and other components of the distributed computing environment 410. However, it should be understood that the design, deployment, and execution of user-restricted process scheduling and execution functionality need not be limited to the specific system and hardware implementations described above in FIGS. 1-4, but may be performed within other hardware and system environments comprising other combinations of the hardware and software components. Further, although the example of FIG. 5 relates to designing and deploying process scheduling and execution functionality within new user applications 425, similar processes and techniques may be used for modifying existing user applications 425 in a distributed computing environment 410.

Step 501 corresponds to the design and development phase(s) of a user application 425 for a distributed computing environment 410. These phases may include the application level setup for a user application, and may be performed by designers, developers, and distributors of user applications for enterprise systems and other distributed computing environments. Certain user applications 425 may be developed for and deployed to specific distributed computing environments, while other applications may be generally developed for one or more different types of distributed computing environments and may be distributed via websites, or public and/or private application stores. Such user applications 425 for enterprise systems and other distributed computing environments may include, for example, human capital management (HCM) applications, financial management applications, supply chain management applications, inventory management applications, enterprise resource planning (ERP) applications, document management applications, eCommerce applications, customer relationship management (CRM) applications, and the like.

In step 501, application designers and developers may identify one or more transaction pages within their applications on which the user-restricted process scheduling and executing functionality may be available. A transaction page may be, for example, a web page within a web-based application or other user interface screen within a non-web based application, which offers some user functionality during execution of the application. In various examples, any user interface or any portion of a user interface (e.g., frame, window, etc.) within an application 425 may be transaction page. The process scheduling and executing functionality defined by application designers and developers in step 501 may include the user-initiated processes that may be permitted on various transaction pages, as well as certain details of such user-initiated processes (e.g., process name/type, scheduling details, parameters, etc.).

In some embodiments, application designers may access process scheduler tools 421 and/or a process scheduler API 422 to define the process scheduling and executing functionality that may be available to users of certain transaction pages in an application 425. For example, one or more create/edit schedule tools 421 may allow application designers to provide input at design-time defining the process scheduling and executing functionality available for the application 425. Such processor schedule tools 421 may provide a selectable list of the available processes, process types, etc., that may be scheduled and executed within the distributed computing environment 410. From the create/edit schedule tool 421, the application designer may select a process type, a process name, a component interface name, an output destination type, and an output destination format. The application designer may also define one or more modifiable parameters which may be set by the user at runtime. For such modifiable parameters, the application designer may set at design time the parameter name, parameter type, default value (which may or may not be overwritten by the application user at runtime), and whether the parameter is optional or non-optional.

Step 502 corresponds to the deployment within the distributed computing environment 410 of the user application 425 designed in step 501. Application deployment may include installation, setup, and configuration and testing tasks, and may be performed by authorized users such as system administrators and functional analysts of the distributed computing environment 410. During the deployment phase in step 502 for a user application 425, administrative users may update the process scheduling and executing information for the application 425 defined in the design phase in step 425 by updating the process scheduling and execution information and setting up the scheduling and execution environment within the distributed environment 410. Like step 501, the application setup during deployment in step 502 may be performed by users manually or programmatically, via process scheduler tools 421 and/or a process scheduler API 422. For example, during the application deployment in step 425, a create/edit schedule tool 421 provided by the process scheduler 420 may allow a user to designate a server where the process is to be run, and to input one or more distribution lists of users to receive process notifications and process status updates. Additionally, an optional template may be defined during the deployment in order to preset some or all of the run control data and settings that will govern the execution of the application 425 during runtime. As discussed in more detail below, setting templates during the deployment phase in step 502 may be optional, and selected template settings may be overridden by users during the deployment phase and/or during the execution phase. Further, during the application deployment in step 502, process execution permissions and roles may be granted to specific users and groups within the distributed environment 410.

Step 503 corresponds to the execution phase of a user application 425 that was designed in step 501 and deployed in step 502. Execution of user applications 425 within the distributed computing environment 410 may be initiated by users via user devices 430. During execution of an application 425, users may interact with various different transaction pages (e.g., web-pages, user interface screens and objects, etc.) of the application. As discussed in more detail below, the end users of an application that has been designed and deployed to include user-restricted process scheduling and execution functionality may activate this functionality via the different transaction pages of the user applications 425. For instance, users may discover and initiate the process scheduling and execution functionality associated with a transaction page by selecting a menu option (e.g., a "Related Actions" button, or process scheduling icon) on a transaction page. Authorized users may then be able to initiate and configure a process to be scheduled and executed via the transaction page, with minimal inputs by the user. After scheduling a process to be executed, the user may receive subsequent notifications confirming the successful scheduling of the process, the successful execution of the process, process execution updates, and report distribution status updates. Alternatively, if the user is not authorized to schedule the process via the transaction page, then the user may receive an error message or other notification. The runtime steps including the process scheduling and execution are described in more detail below in reference to FIG. 6.

Figure 6:
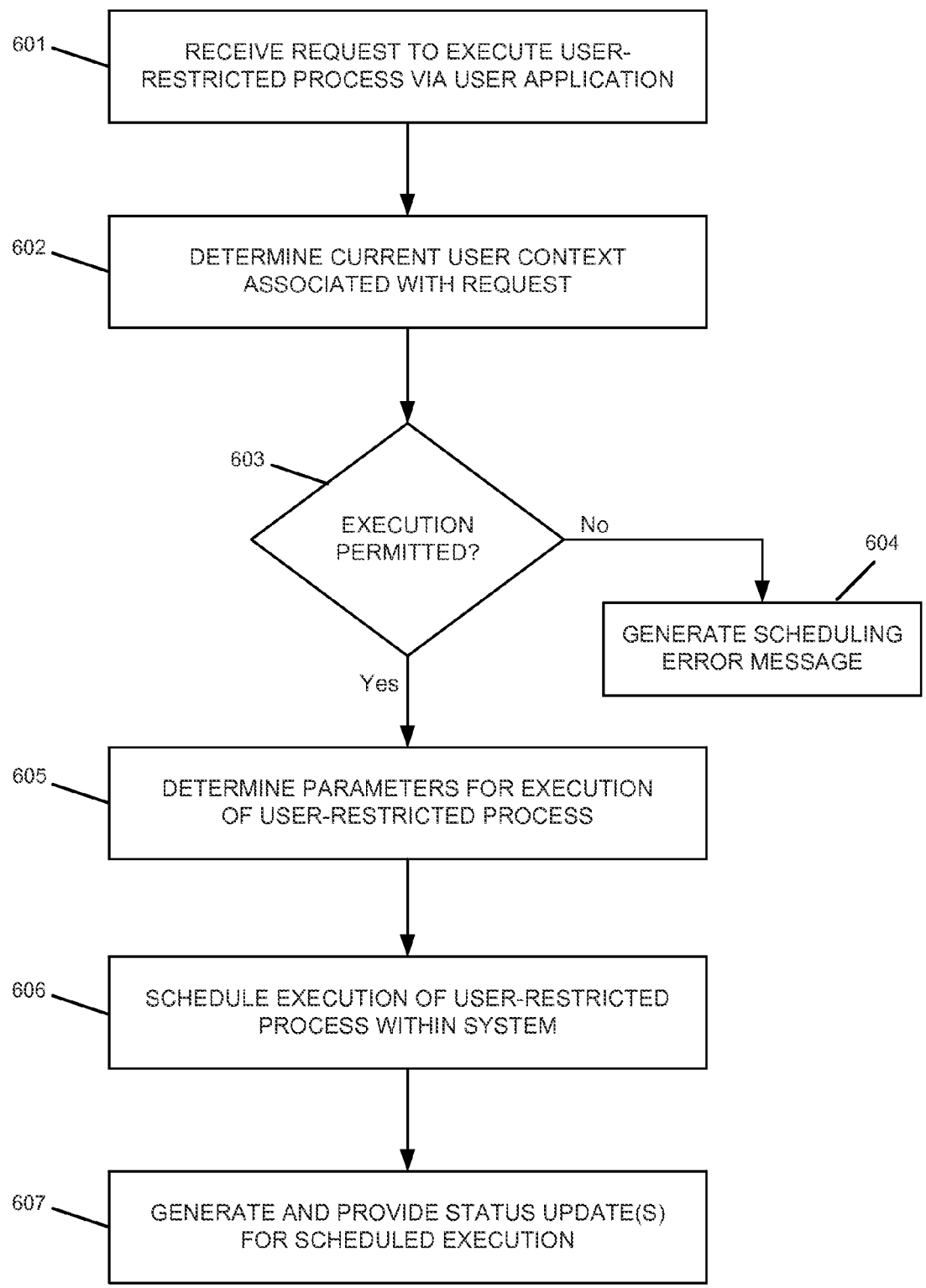
FIG. 6 is a flowchart illustrating a process for scheduling and executing a user-restricted process via a user application within a distributed computing environment, according to one or more embodiments of the present invention.

FIG. 6 is a flowchart illustrating an example process for scheduling and executing a user-restricted process via a user application within a distributed computing environment. As discussed below, the steps in this process may be performed by one or more components in the example system 400, such as the user applications 425 and/or process scheduler 420 executing on the underlying hardware and software components 412-418 of the distributed computing environment 410. The steps in FIG. 6 may also be executed in conjunction with input from user devices 630, administrative/supervisor devices 635 and/or any other components of the distributed computing environment 410. However, it should be understood that the scheduling and execution of user-restricted processes in distributed computing environments need not be limited to the specific system and hardware implementations described above in FIGS. 1-4, but may be performed within other hardware and system environments comprising other combinations of the hardware and software components described herein.

In step 601, a request is received via a user application 425 to execute a user-restricted process. Such user-restricted processes may include, for example, report generation processes, processes to initiate/trigger of system functions, and/or processes to perform system maintenance functions within the distributed computing environment 410. Such processes may be considered "user-restricted" when the distributed computing environment 410 might not permit all users to perform all variations of the processes in all situations. For example, a report generation process may be accessible to some users but not others, or may be used by all users to generate certain some reports but not to generate other reports, or may be used by certain users during times and from certain transaction pages of certain user applications 425 but not at other times and/or from other transaction pages or other applications 425. In each of these examples, the report generation process may be considered a user-restricted process.

The request may be received in step 601 via a transaction page of a user application 425. As discussed above, a transaction page may be a user interface screen or component of the user application 425, including specific web pages of web-based application or other interface components of non-web based applications. As discussed in FIG. 5, the process scheduling and execution functionality may be added to and customized within certain transaction pages during the design and development phases (step 501), and the deployment phase (step 502) of the user application 425.

Referring briefly to FIG. 7A, an example user interface is shown for scheduling and executing a user-restricted process. In this example, a transaction page 700a of a purchasing application 425 provides various user functionality relating to purchase order inquiries. In addition to the user functionality provided normally on the purchase order inquiry transaction page 700a, an action icon 701 and collapsible actions menu 702 have been added to this transaction page during the design, development, and deployment phases of this application 425. In this example, the action icon 701 indicates to users of the transaction page 700a that some additional user-restricted process scheduling and execution functionality may be initiated from this page 700a. After selecting the action icon 701, the collapsible menu 702 may appear on the page 700a listing the specific processes (or actions) that may be scheduled by users from the transaction page 700a. In this example, application users may initiate a first process to generate a vendor purchase order report, which is being selected by the user in FIG. 7A, or a second process to generate a personal purchase order history for the user.

In some embodiments, the process scheduling and execution functionality added to the transaction pages of a user application 425 may be customized based on the permissions and authorization level of the user interacting with the page. For example, if the current user of the transaction page 700a in FIG. 7A does not have the authorization (as assigned during deployment of the application 425) to schedule and execute either of the processes in the actions menu 702, then the application 425 might not display the action icon 701 or the actions menu 702 on the transaction page 700a for that user. If a different user has authorization to generate a personal purchase order history, but not to generate a generate a vendor purchase order report, then the application may display the action icon 701 for that user but may only list a single item in the actions menu 702 corresponding to scheduling and executing a personal purchase order history. As discussed below, in other embodiments, the functionality to initiate scheduling and execution of processes may be displayed via transaction pages 700*a* regardless of the current user, and the determination of whether the user is currently authorized to schedule a requested process may be performed after the user requests the process scheduling and execution functionality.

In step 602, after a request to schedule and execute a process has been received, a current user context associated with the request may be collected and determined. One component of the current user context may include the identity of the user that initiated the request in step 601. As discussed above, certain users and groups of users (e.g., teams, roles, distribution lists, etc.) may be assigned different permissions for scheduling and executing different processes within the distributed computing environment 410. These permissions may be assigned by system administrators during the application deployment, but also may be subsequently revoked or modified by authorized users throughout the life the distributed computing environment 410. Thus, step 602 may include determining the current user of the application 425 that initiated the request in step 601, and also may include retrieving one or more current set of process scheduling and execution permissions associated with that user. User permissions for process scheduling and execution may be stored, for example, in a process scheduler database 423, or in the underlying databases 412 of the distributed computing environment 410.

In addition to the current user and current set of process scheduling and execution permissions with that user, the user context collected and/or determined in step 602 may include other data associated with the user, the process execution request, the current transaction page, etc. For example, the user context collected in step 602 may include the context of the user's current session within the user application 425, including current actions that the user is performing, previous transaction pages that the user has visited, and any previous actions performed by the user from those transaction pages. As discussed below, in some cases a user's authorization to schedule and execute a process may be based on the pending and previous actions performed within the user's current application session (or runtime session), the transaction pages visited by the user, the previous actions performed by the user, etc. The user context retrieved in step 602 may also include the time, date, and day of the week/month/year that the request was received, and certain processes may be permitted to be scheduled and executed by users at certain times and not others. Additionally, the user context retrieved in step 602 may also include a current state of the user application 425 or other applications 425, the process scheduler 420, and/or the underlying systems resources 412-418 within the distributed computing environment 410. As discussed below, certain processes may be permitted during certain application states and may not be permitted during others. Additionally, certain processes may be permitted only during certain times based on the states of the underlying system resources 412-418, such as network usage or congestion that is above or below a certain threshold, processing load or capacity that is above or below a certain threshold, data storage amounts or capacity that is above or below a certain threshold, etc. Thus, in various different embodiments, any combination of the data described herein relating to the user, the user's current and previous application sessions, the process execution request, the current state of the transaction page, and the current state of the distributed computing system 410, may be retrieved or determined in step 602 as part of the user context for the request.

In step 603, it is determined whether or not the requested process scheduling and/or execution are permitted. This determination may be performed, for example, by the user application 425 in combination with the process scheduler 420, based on the user context data retrieved in step 602. For instance, the permission conditions for a user to schedule and execute a certain process, which may be stored in the process scheduler database 423, may be retrieved in step 603 and compared to the current user context data retrieved in step 602. If the user is currently authorized to perform the process (603:Yes), then the process may be scheduled and executed in steps 605-607, described below. On the other hand, if the user is not currently authorized to perform the process (603:No), then an error message may be generated in step 604 and presented to the user via the same transaction page from which the user initiated the request. In some embodiments, in addition to generating and presenting an error message to the user in step 604, the user application 425 and/or process scheduler 420 may generate and transmit similar error messages to the user and/or other related users (e.g., supervisors, system administrators, etc.) via the application 425 or by email, text message, voice message, etc. The user application 425 and/or process scheduler 420 also may log any unauthorized process scheduling attempts, which may become part of the user context for future requests to schedule and execute user-restricted processes within the distributed computing environment 410.

As discussed above, various different combinations of criteria may be used to determine whether the user is permitted to schedule and execute the requested process in step 603. In fact, any combination of the user context data collected or determined in step 602, along with other factors discussed herein, may be used to determine whether or not a user is authorized to schedule and execute a user-restricted process within the distributed computing environment 410. As previously discussed, in some cases, the determination of whether the user is authorized to schedule and execute a process may depend only on the identity of the user and the requested process. During the deployment phase, a system administrator may define which users or groups of users have the authorization to schedule and execute which processes from which transaction pages. However, in other cases, whether or not a user is authorized to schedule and execute a process may depend on whether or not the user has authorization, along with a number of other factors, such as the user's current and previous actions within the user application 425 and/or other applications 425 in the computing environment, the current time, day, and date, the current state of the application 425, and/or the current states of any other applications 425 or other underlying system resources 412-418 within the distributed computing environment 410.

Several examples of different possible criteria for authorizing process scheduling and execution are described below, but it should be understood that these examples are non-limiting and illustrative only. For instance, certain processes may be scheduled and executed by authorized users only at times when the application 425 is currently servicing a manageable number of tasks, processing requests, or user connections, and not when the application's current usage data exceeds these predetermined usage levels or thresholds. Other processes may be scheduled and executed only a limited number of times by authorized users, for example, N times per user per runtime session, N times per user per day/week/month, etc. Other processes may be scheduled and executed by authorized users only on certain days, dates, or at certain times, for example, nights, weekends, or other off-peak times within the distributed computing environment 410. Other processes may be scheduled and executed by authorized users only during periods of low network usage, high throughput, low network congestion, etc., as measured by the network devices 414 within the distributed computing environment 410. Other processes may be scheduled and executed by authorized users only if the requesting user has not recently initiated the scheduling and execution of the same or a similar process. Other processes may be scheduled and executed by authorized users only if the user has performed a predetermined action within the user application 425 during the same user session or a recent previous user session of the application 425. As noted above, these examples are non-limiting and illustrative only, and may range from simple single factor determinations to highly complex and dynamic analyses. In such examples, the logic and conditions used for performing the determination in step 603 may be stored, for example, within a process scheduler database 423 and the determinations in step 603 may be performed by the user application 425 and/or the process scheduler 420.

After determining that the request to schedule and execute the process is permitted (603:Yes), the parameters for executing the process are determined in step 605. As discussed above in reference to FIG. 5, some parameters for executing a process may be set during the design and development phase (step 501) by application developers and distributors, while other parameters may be set during the deployment phase (step 502) by administrators of the distributed computing environment 410, and still other parameters may be set at runtime (step 503) by the user initiating the request to schedule and execute the process. For example, the designer of the user application 425 may set an initial set of parameters for the process execution, such as the process type, process name, component interface name, output destination type, and output destination format. The application designer may also define one or more modifiable parameters that may be set by the user at runtime. During the deployment of the user application 425 within the distributed computing environment 410, a system administrator or other authorized user may set additional parameters for the process execution, such as the server name on which the process is to be executed, and additional run control data and settings that will govern the execution of the user application 425, and govern the scheduling and execution of any processes initiated by users at runtime. Finally, during execution of the user application 425, the user that requested the scheduling and execution of the process may have the opportunity to set additional parameters, or to overwrite parameters previously set during the design, development, and deployment phases.

Figure 7B:
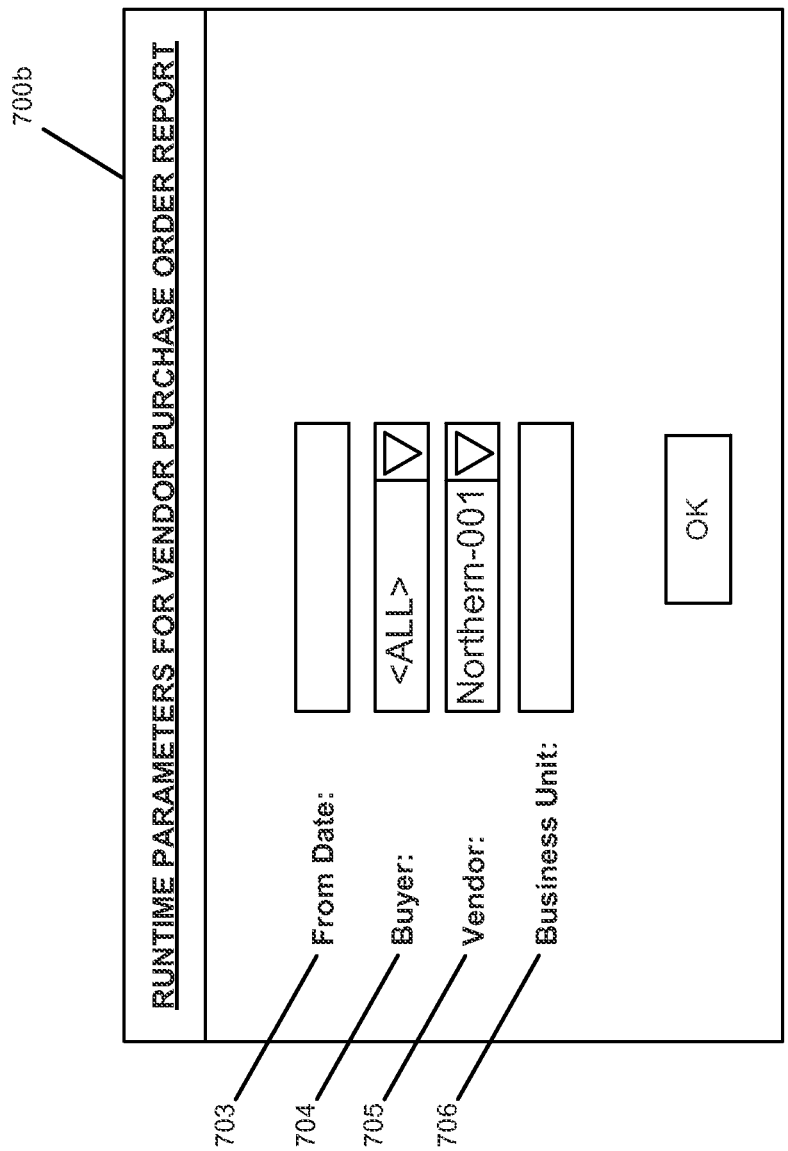

Referring now to FIG. 7B, an example is shown of an interface 700b that allows a user to input runtime parameters for scheduling and executing a "Vendor Purchase Order Report" process on the distributed computing environment 410. In this example, four runtime parameters 703-706 may be set by the user in connection with the scheduling and execution of the process. In some embodiments, these runtime parameters may correspond to the modifiable parameters set by the application designer, so that the parameter names, types, selectable values or ranges, may be restricted and customized during the application design phase.

Although four runtime parameters are shown in this example, it should be understood that different numbers of runtime parameters, including zero runtime parameters, may be set by users when scheduling and executing process in other examples. Additionally, the numbers of runtime parameters as well as the parameter's names, types, whether they are optional or non-optional, and the range of possible values that may be entered for the runtime parameters, may vary not only based on the process to be executed, but also based on the user that requested the process scheduling and execution. For example, certain users of the application 425 may be authorized to generate vendor purchase orders for any buyer and any vendor, while other users may be authorized to generate vendor purchase orders for only a single buyer or single vendor, or a limited subset of buyers and vendors. In such cases, any runtime parameters 703-706 that are non-editable by the user, or are limited to certain values for the user, may be restricted via the user interface 700b, so that the user may only select valid parameters. In other examples, the user may input both valid and invalid values into the user interface 700b, but may receive an error message if the user submits any unauthorized values.

In some embodiments, certain fields for inputting runtime parameters (e.g., 703-706 in FIG. 7B) may be pre-filled for the user, either in a non-editable form or an editable form that allows the user to overwrite the pre-filled values. For example, certain fields may be dynamically pre-filled by the user application 425 (e.g., the vendor field 705 in FIG. 7B), based on the data within the transaction page from which the user requested the process scheduling and execution (e.g., the vendor field in FIG. 7A). Additionally, runtime parameter values may be pre-filled based on a template defined by a system administrator during the application deployment within the distributed computing environment 410. For example, a certain implementation of a distributed computing environment 410, and/or individual systems or administrators within a distributed computing environment 410, may have a number of preexisting templates that define the runtime parameters and scheduling and execution settings for user-restricted processes. During the deployment of a user application 425, or anytime thereafter, an administrator may select a template to be applied to any of the user-restricted processes that are available via the transaction pages of the application 425. Once a template is selected and applied by the administrator, the runtime parameters and data settings will be pre-filled for the user. In various different embodiments, the user may be permitted to override none, some, or all of the runtime parameters and data settings of a template before initiating the submitting the parameters.

In step 606, the requested process may be scheduled for execution within the distributed computing environment 410. In order to schedule the process for execution, the user application 425 and/or the process schedule may create an object in a scheduler table (or run control table) identifying the process to be executed, the user, any modifiable execution parameters, and other variables relevant to the computing environment 410. In some cases, the process scheduler 420 may maintain multiple different scheduler tables for different processes and/or types of processes. For instance, a single scheduler table may contain all of the scheduled requests for generating purchase order reports via a purchase order reporting process, while another table may contain all of the requests for generating inventory reports via a separate inventory management process, and another table may contain all of the requests for generating financial reports via a separate financial process, and another table may contain all of the requests for executing system software upgrades via a separate software patch process, and so on.

Figure 8A:
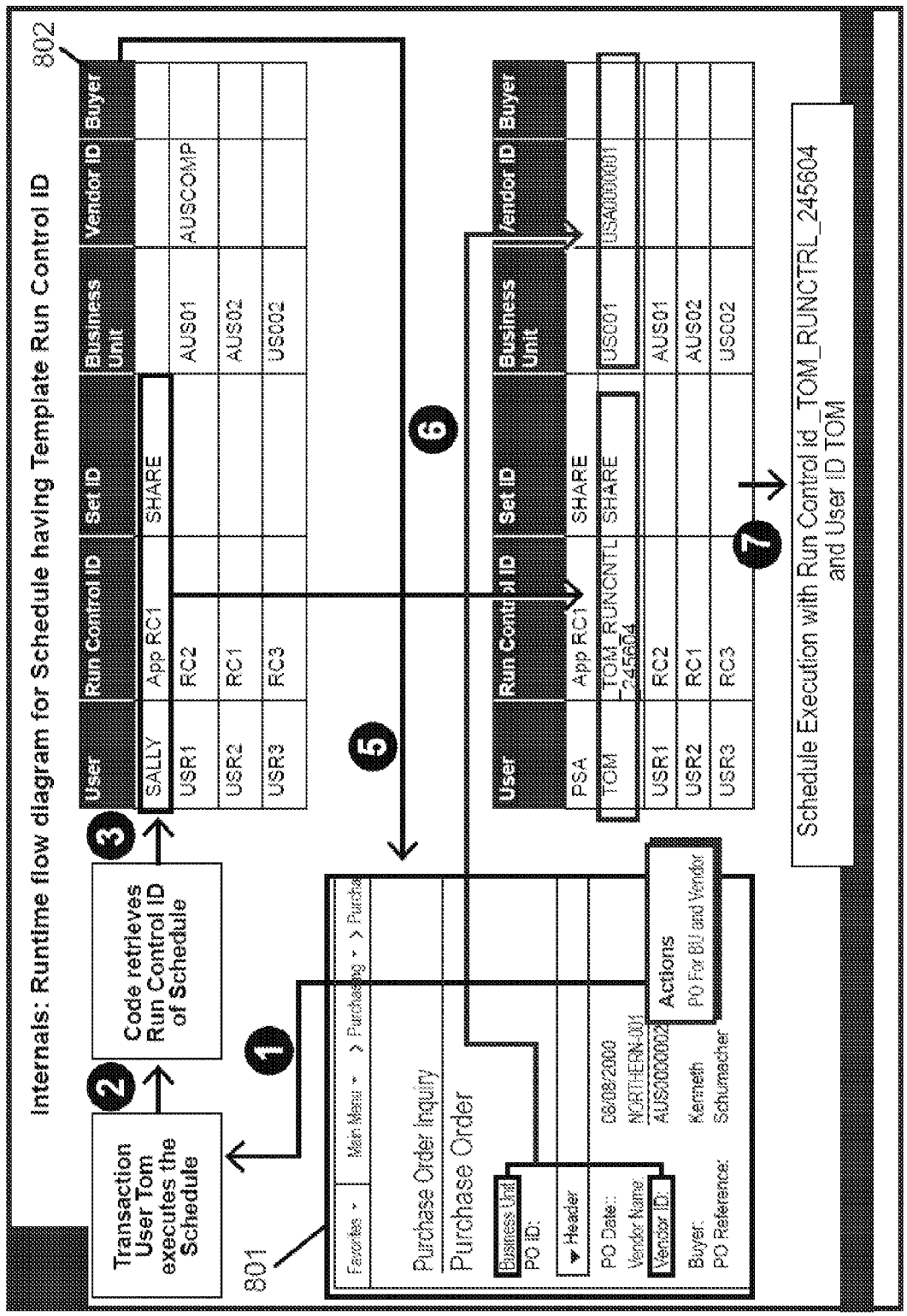
FIGS. 8A and 8B are example process flow diagrams for scheduling and executing a user-restricted process via a user application within a distributed computing environment, according to one or more embodiments of the present invention.
Figure 8B:
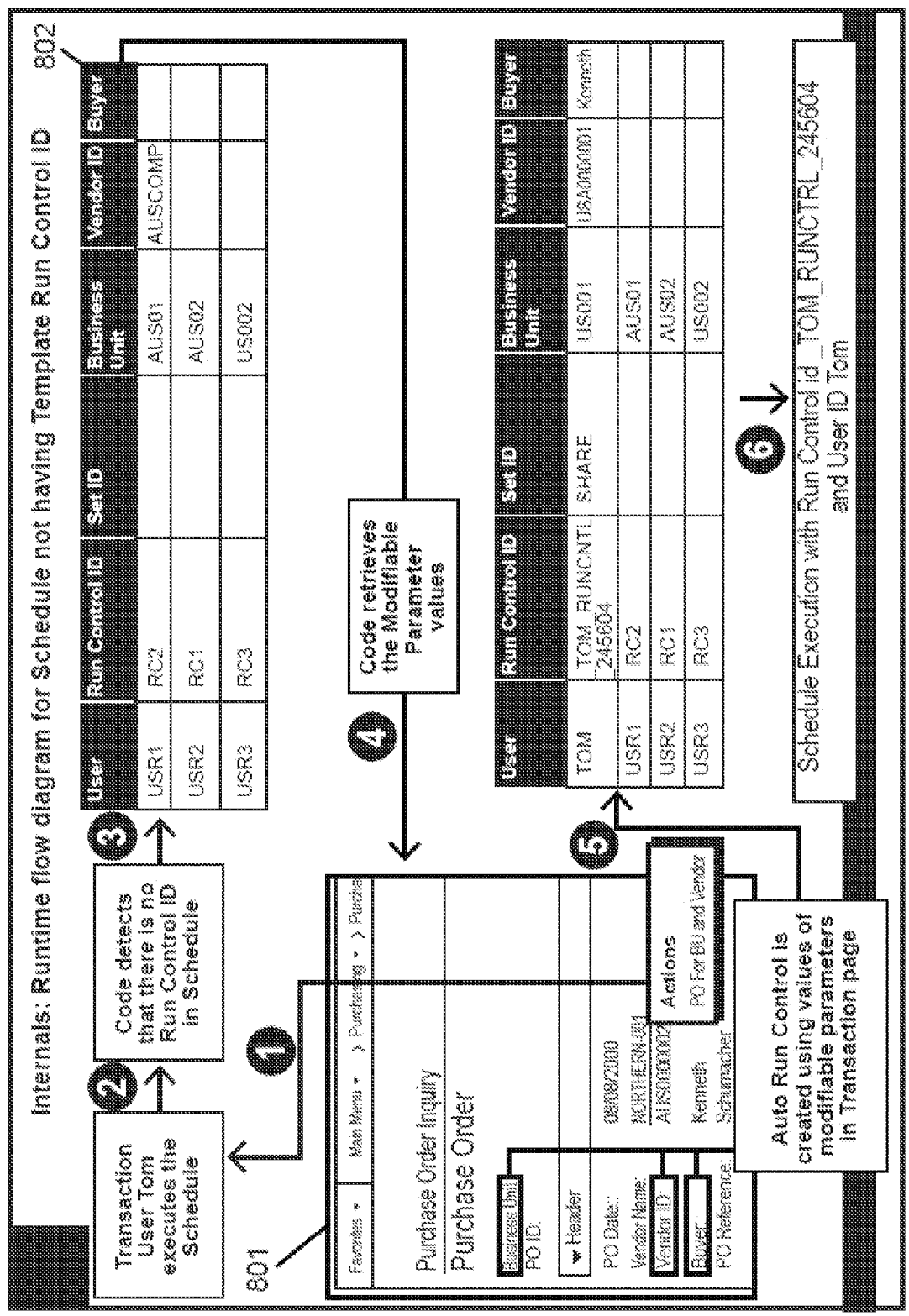

In some embodiments, the process scheduler 420 may have predefined run control identifiers associated with different scheduled processes. Referring now to FIGS. 8A and 8B, two examples are shown of process flow diagrams for scheduling a user-restricted process. In both FIGS. 8A and 8B, a user has requested the scheduling of a purchase order report generation process via the transaction page 801. After the initiation of the scheduling request by the user, the process scheduler 420 may determine whether a run control identifier is predefined for the requested process. In FIG. 8A, such a predefined run control identifier exists, and the process scheduler 420 may use the predefined run control identifier, along with the runtime parameters provided by the user and/or the modifiable fields from the transaction page 801 in order to schedule the process. In contrast, in FIG. 8B, a predefined run control identifier does not exist for the requested process. In this case, the process scheduler 420 may retrieve the runtime parameters provided by the user and/or the modifiable fields from the transaction page 801 in order to generate a run control identifier.

In step 607, at one or more times during and/or after the requested process is scheduled and executed, status updates may be generated and provided to the user that requested the process scheduling and execution. Status updates may be generated in step 607 by the process scheduler 420 and/or the user application 425, and may be provided to the user via the transaction pages of the user application 425 and/or other external notification systems (e.g., email, text messaging, phone and voice messaging systems, etc.). When a user-restricted process is scheduled and executed via a user application 425, status updates may be provided to the user that initiated the scheduling and execution at one or more different times or events, for example, when the process the successfully scheduled (or if the scheduling is unsuccessful or unauthorized), at the beginning of the process execution, at intervals during the process execution to provide execution status updates, and at the completion of the process execution. In response to any of these events, the status update may provide a link or document containing additional detailed status information that may be reviewed by the user. For example, if the process is a report generation process, or another process that generates output, then a status update indicating that the process has been successfully completed may include a link to the generated report or other process output.

Status updates in step 607 may be provided to the user via the same user application 425 from which the user requested the process scheduling and execution in step 601. For example, the application 425 may track the user's session to different transaction pages, and when a status update is received from the process scheduler 420, the application 425 may provide the status update to the user via the user's current transaction page. In other cases, status updates initiated by a user from a first application 425 may be received by the user at a second different application 425. For instance, one or more of the user applications 425 in the distributed computing environment 410 may periodically query the process scheduler 420 and retrieve status updates for any users currently using that application. Alternatively or additionally, the process scheduler 420 may transmit notifications to the user via one or more external notification systems, such as email, text messaging, phone and voice messaging systems, instant messaging, and the like.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for scheduling execution of a user-restricted process within a distributed computing system, the method comprising:
   receiving a runtime request to execute a user-restricted process within a distributed computing system, the runtime request received via a transaction page of a user application during a runtime session of a user within the distributed computing system;
   determining a current user context associated with the runtime request, the current user context based on at least one of the transaction page, the user, or the runtime session of the user within the distributed computing system, or any combination thereof;
   determining whether or not to permit execution of the user-restricted process based on the current user context associated with the runtime request; and
   scheduling execution of the user-restricted process based on a determination to permit execution of the user-restricted process, wherein scheduling execution of the user-restricted process comprises:
      retrieving a preexisting template containing settings that control execution of the user-restricted process;
      modifying the transaction page with an interface to allow at least one of the settings that control execution of the user-restricted process to be changed from the settings contained in the preexisting template;
      receiving changes to the settings that control execution of the user-restricted process via the transaction page; and
      executing the user-restricted process, wherein the user-restricted process is executed in accordance with the changes received via the transaction page to the settings that control execution of the user-restricted process.

2. The method of claim 1, wherein scheduling execution of the user-restricted process further comprises:
   determining that one or more user-modifiable runtime variables are available for executing the user-restricted process; and
   modifying the transaction page via the interface to retrieve the one or more user-modifiable runtime variables.

3. The method of claim 1, wherein the current user context corresponds to a set of process scheduling and execution permissions associated with at least one of the transaction page or the user.

4. The method of claim 1, wherein scheduling execution of the user-restricted process comprises:
   initiating execution of the user-restricted process on the distributed computing system, using a predetermined set of process parameters that are not selectable by the user.

5. The method of claim 1, wherein scheduling execution of the user-restricted process comprises:
   retrieving data from the transaction page; and
   initiating execution of the user-restricted process on the distributed computing system, using the data retrieved from the transaction page.

6. The method of claim 1, further comprising:
   generating status update data for the scheduled execution of the user-restricted process;
   determining that the user has navigated to a second transaction page of the user application during the runtime session; and
   modifying the second transaction page to provide the status update data for the scheduled execution of the user-restricted process.

7. The method of claim 1, wherein the user-restricted process is a report generation process of the distributed computing system.

8. The method of claim 1, wherein the user-restricted process is a report generation process of the distributed computing system.

9. A system comprising:
   a processing unit comprising one or more processors; and
   memory coupled with and readable by the processing unit and storing therein a set of instructions which, when executed by the processing unit, causes the processing unit to schedule execution of a user-restricted process within the system by:
   receiving a runtime request to execute a user-restricted process within the system, the runtime request received via a transaction page of a user application during a runtime session of a user within the system;
   determining a current user context associated with the runtime request, the current user context based on at least one of the transaction page, the user, or the runtime session of the user within the system, or any combination thereof;
   determining whether or not to permit execution of the user-restricted process based on the current user context associated with the runtime request; and
   scheduling execution of the user-restricted process based on a determination to permit execution of the user-restricted process, wherein scheduling execution of the user-restricted process comprises:
   retrieving a preexisting template containing settings that control execution of the user-restricted process;
   modifying the transaction page with an interface to allow at least one of the settings that control execution of the user-restricted process to be changed from the settings contained in the preexisting template;
   receiving changes to the settings that control execution of the user-restricted process via the transaction page, and
   executing the user-restricted process, wherein the user-restricted process is executed in accordance with the changes received via the transaction page to the settings that control execution of the user-restricted process.

10. The system of claim 9, wherein scheduling execution of the user-restricted process further comprises:
    determining that one or more user-modifiable runtime variables are available for executing the user-restricted process; and
    modifying the transaction page via the interface to retrieve the one or more user-modifiable runtime variables.

11. The system of claim 9, wherein the current user context corresponds to a set of process scheduling and execution permissions associated with at least one of the transaction page or the user.

12. The system of claim 9, wherein scheduling execution of the user-restricted process comprises:
    retrieving data from the transaction page; and
    initiating execution of the user-restricted process on the, using the data retrieved from the transaction page.

13. The system of claim 9, wherein scheduling execution of the user-restricted process comprises:
    initiating execution of the user-restricted process on the distributed computing system, using a predetermined set of process parameters that are not selectable by the user.

14. The system of claim 9, the memory storing therein additional instructions which, when executed by the processing unit, causes the processing unit to:
    generate status update data for the scheduled execution of the user-restricted process;
    determine that the user has navigated to a second transaction page of the user application during the runtime session; and
    modify the second transaction page to provide the status update data for the scheduled execution of the user-restricted process.

15. A method for scheduling execution of a user-restricted process within a distributed computing system, the method comprising:
    receiving a runtime request to execute a user-restricted process within a distributed computing system, the runtime request received via a transaction page of a user application during a runtime session of a user within the distributed computing system;
    determining a current user context associated with the runtime request, the current user context based on at least one of the transaction page, the user, or the runtime session of the user within the distributed computing system, or any combination thereof;
    determining whether or not to permit execution of the user-restricted process based on the current user context associated with the runtime request;
    scheduling execution of the user-restricted process based on a determination to permit execution of the user-restricted process;
    generating status update data for the scheduled execution of the user-restricted process;
    determining that the user has navigated to a second transaction page of the user application during the runtime session; and
    modifying the second transaction page to provide the status update data for the scheduled execution of the user-restricted process.

16. The method of claim 15, wherein scheduling execution of the user-restricted process comprises:

determining that one or more user-modifiable runtime variables are available for executing the user-restricted process; and modifying the transaction page with an interface to retrieve the one or more user-modifiable runtime variables.

17. The method of claim 15, wherein scheduling execution of the user-restricted process comprises:

retrieving a preexisting template containing runtime parameters and scheduling and execution settings associated with the user-restricted processes; and executing the user-restricted process in accordance with the retrieved runtime parameters and scheduling and execution settings from the preexisting template.

18. The method of claim 15, wherein the current user context corresponds to a set of process scheduling and execution permissions associated with at least one of the transaction page or the user.

19. The method of claim 15, wherein scheduling execution of the user-restricted process comprises:

initiating execution of the user-restricted process on the distributed computing system, using a predetermined set of process parameters that are not selectable by the user.

20. The method of claim 15, wherein scheduling execution of the user-restricted process comprises:

retrieving data from the transaction page; and initiating execution of the user-restricted process on the distributed computing system, using the data retrieved from the transaction page.

21. The method of claim 15, wherein the user-restricted process is a report generation process of the distributed computing system.

22. A system comprising:

a processing unit comprising one or more processors; and memory coupled with and readable by the processing unit and storing therein a set of instructions which, when executed by the processing unit, causes the processing unit to schedule execution of a user-restricted process within the system by:

receiving a runtime request to execute a user-restricted process within a distributed computing system, the runtime request received via a transaction page of a user application during a runtime session of a user within the distributed computing system;

determining a current user context associated with the runtime request, the current user context based on at least one of the transaction page, the user, or the runtime session of the user within the distributed computing system, or any combination thereof;

determining whether or not to permit execution of the user-restricted process based on the current user context associated with the runtime request;

scheduling execution of the user-restricted process based on a determination to permit execution of the user-restricted process;

generating status update data for the scheduled execution of the user-restricted process;

determining that the user has navigated to a second transaction page of the user application during the runtime session; and modifying the second transaction page to provide the status update data for the scheduled execution of the user-restricted process.

23. The system of claim 22, wherein scheduling execution of the user-restricted process comprises:

determining that one or more user-modifiable runtime variables are available for executing the user-restricted process; and modifying the transaction page with an interface to retrieve the one or more user-modifiable runtime variables.

24. The system of claim 22, wherein scheduling execution of the user-restricted process comprises:

retrieving a preexisting template containing runtime parameters and scheduling and execution settings associated with the user-restricted processes; and executing the user-restricted process in accordance with the retrieved runtime parameters and scheduling and execution settings from the preexisting template.

25. The system of claim 22, wherein the current user context corresponds to a set of process scheduling and execution permissions associated with at least one of the transaction page or the user.

26. The system of claim 22, wherein scheduling execution of the user-restricted process comprises:

initiating execution of the user-restricted process on the distributed computing system, using a predetermined set of process parameters that are not selectable by the user.

27. The system of claim 22, wherein scheduling execution of the user-restricted process comprises:

retrieving data from the transaction page; and initiating execution of the user-restricted process on the distributed computing system, using the data retrieved from the transaction page.

28. The system of claim 22, wherein the user-restricted process is a report generation process of the distributed computing system.

* * * * *

UNITED STATES PATENT AND TRADEMARK OFFICE
CERTIFICATE OF CORRECTION

| | |
|---|---|
| PATENT NO. | : 9,600,327 B2 |
| APPLICATION NO. | : 14/685293 |
| DATED | : March 21, 2017 |
| INVENTOR(S) | : Rangaraju et al. |

It is certified that error appears in the above-identified patent and that said Letters Patent is hereby corrected as shown below:

In the Claims

In Column 27, Line 65, in Claim 9, delete "page," and insert -- page; --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*